INVENTOR
JOHN GUELPH

United States Patent Office 3,543,340
Patented Dec. 1, 1970

3,543,340
MOLDING APPARATUS WITH INDIVIDUALLY SEPARABLE PARISON MOLD AND NECK RING PARTS
John Guelph, Paterson, N.J., assignor to Emery I. Valyi, Riverdale, N.Y.
Filed Feb. 5, 1968, Ser. No. 702,843
Int. Cl. B29d 23/03
U.S. Cl. 18—5
5 Claims

ABSTRACT OF THE DISCLOSURE

Molding apparatus comprising a two-part parison mold, a blow mold, a blow core to be transferred therebetween and a two-part neck ring for molding the neck portion of the parison and of the blown article. The neck ring parts are formed with tapered flanges to seat in the parison mold cavity to center the blow core while permitting the parison mold to be separated while the neck ring parts remain closed, and with positioning lugs to engage flanges on the blow mold for positioning the blow core therein while permitting the neck ring parts to be separated while the blow mold parts remain closed.

---

This invention relates to molding apparatus of the type wherein a parison of organic plastic material is formed in a parison mold on a blow core, is transferred on the blow core into a blow mold, and is expanded into the blow mold cavity to form a hollow object.

In apparatus of this type, the neck of the parison is molded in a neck ring which is transferred with the blow core from the parison mold to the blow mold and remains in place during the blowing operation. In apparatus using split mold parts and a split neck ring, it is desirable to separate the parison mold parts after the parison has been formed while maintaining the neck ring closed, so as to release the parison from the parison mold while retaining its neck portion confined by the neck ring. The blow core, neck ring, and formed parison are then transferred to the blow mold and the parison is blown to form the hollow object.

After blowing, the blow core may be retracted and, thereafter, it is desirable to separate the neck ring to release the formed object while the blow mold remains closed to retain that object therein.

An object of the present invention is to provide novel and improved apparatus which is capable of operating in a sequence such as above described wherein a neck ring may remain closed while the parison mold opens and, in turn, the neck ring may be opened without having to open the blow mold, all with the assurance of axial alignment of the several mold components.

Another object is to provide a neck ring and mold construction in which the parison mold can be opened without opening the neck ring and in which the neck ring can be opened in turn without opening the blow mold.

More specific objects and advantages will be apparent as the nature of the invention is more fully disclosed.

The features of the invention will be better understood by referring to the following description, taken in connection with the accompanying drawing, in which a specific embodiment has been set forth for purposes of illustration.

Figure 1:
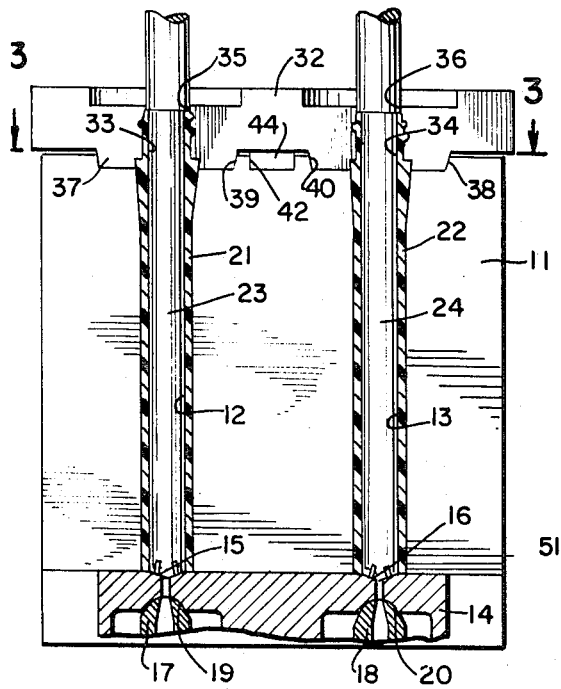
FIG. 1 is a longitudinal section through a parison mold embodying the invention, taken along line 1—1 of FIG. 3, and showing a pair of blow cores and cooperating parison mold parts.
Figure 3:
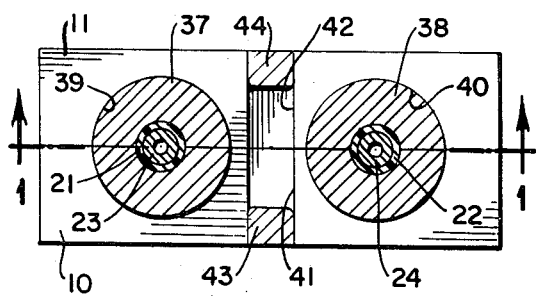
FIG. 3 is a transverse section taken on the line 3—3 of FIG. 1.

FIGS. 1 and 3 illustrate the parison mold station comprising a split mold having mold parts 10 and 11 having a pair of mold cavities 12 and 13 spaced apart for the formation of a pair of parisons. A bottom member 14 is disposed to close the bottom of the mold cavities and is formed with concave portions 15 and 16 shaped to form the outer surfaces of the closed ends of the parisons. Injection nozzles 17 and 18 seating in recesses 19 and 20 in the member 14 are adapted to inject the plastic material from a source, not shown, into the mold cavities.

The parisons 21 and 22 are formed on blow cores 23 and 24 which are mounted on suitable carriers, not shown, and are adapted to be inserted axially into the cavities 12 and 13 through the open ends of the cavities opposite the bottom member 14.

The parison cavities are closed by neck rings formed by a pair of neck ring parts 31 and 32 which fit against the upper surface of the closed mold parts 10 and 11. The parts 31 and 32, when closed, have cylindrical portions 33 and 34 shaped to form the outer surface of the neck portion of the parisons and, also, of the blown articles to be formed therefrom. These surfaces 33 and 34 may be threaded if a threaded neck portion is to be formed on the parison. The parts 31 and 32, also, have flanges 35 and 36 which engage the blow cores to close the ends of the neck ring cavities, and are formed with circular flanges 37 and 38 having tapered outer surfaces which seat in bores 39 and 40 in the mold parts 10 and 11 for accurately centering and positioning the blow cores in the cavities. The upper surfaces of the mold parts 10 and 11 midway between the cavities 12 and 13 are provided with registering grooves 41 and 42 in which depending lugs 43 and 44 of the neck ring parts 31 and 32 rest.

The parison mold elements above described are particularly adapted to permit the parison mold parts 10 and 11 to be separated without separating the neck ring parts 31 and 32 so as to release the parison walls while the parisons remain in place on the blow cores. The transverse grooves permit the parts 10 and 11 to be separated transversely without separating the neck ring parts 31 and 32. After the mold parts have been thus separated the blow core and neck ring parts with the formed parisons thereon are withdrawn axially into the blow mold station.

Figure 2:
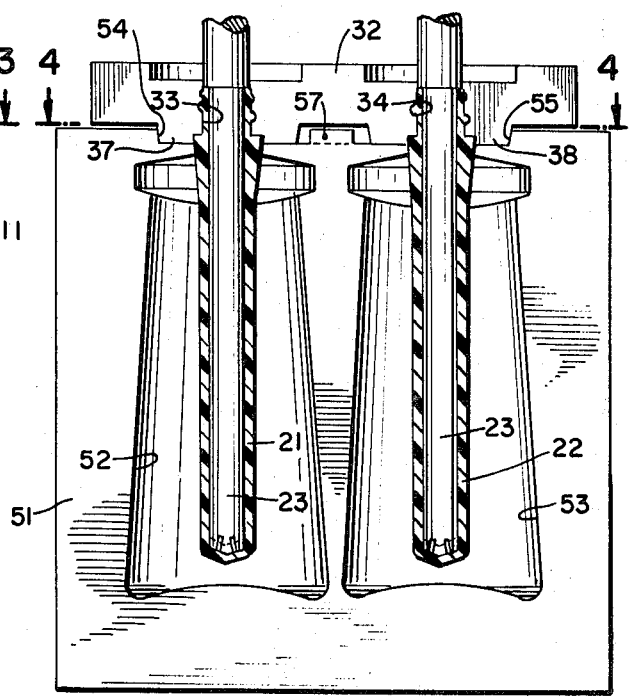
FIG. 2 is a similar section but taken along the line 2—2 of FIG. 4, and showing the blow cores and parisons in cooperating blow mold parts prior to the blowing of the parisons.
Figure 4:
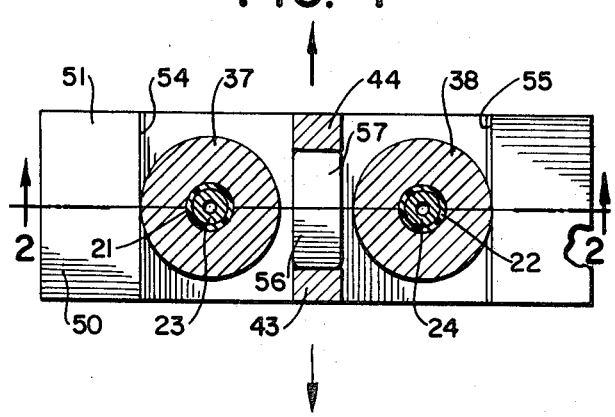
FIG. 4 is a similar transverse section taken on the line 4—4 of FIG. 2.

The blow mold is shown in FIGS. 2 and 4 as comprising a pair of mold parts 50 and 51 having a pair of mold cavities 52 and 53, each of which is adapted to form a blown article. The upper surfaces of the mold parts 50 and 51 are shaped to receive the closed neck ring parts 31 and 32 when the blow cores are inserted into the mold cavities 52 and 53. For this purpose, the mold parts 50 and 51 are formed with transverse grooves 54 and 55 which extend across the open ends of the cavities 52 and 53, respectively, and are adapted to receive the circular, tapered flanges 37 and 38 of the neck ring parts and to provide a channel in which the flanges may slide when the neck ring parts are separated after the article has been blown. The upper surfaces of the parts 50 and 51 are also formed with upstanding flanges 56 and 57 which are disposed midway between the mold cavities 52 and 53 in a position to receive and be engaged by the lugs 43 and 44 of the neck ring parts.

In this embodiment, the neck ring parts and the blow cores are positioned and centered with respect to the blow mold cavities 52 and 53 by the flanges 37 and 38 which slide in the grooves 54 and 55 and by the lugs 43 and 44 which engage and seat against the flanges 56 and 57.

After the objects have been blown, the neck ring parts 31 and 32 can be separated to release the necks of the blown articles and the blow cores while the blow mold parts 50 and 51 remain closed to retain the blown articles. The blow cores may then be extracted from the blown articles while the articles remain confined within the blow mold.

Only so much of the apparatus has been shown as is necessary for an understanding of the present invention. The molding apparatus may, for example, be of the type shown more in detail in my U.S. Pat. No. 3,349,155 (V-210) in which the blow mold with the blown object therein is shifted transversely to a discharge point after the blow core has been withdrawn and the neck mold parts have been separated to release the neck of the blown object. While a two cavity mold has been shown for purposes of illustration, it is to be understood that the molds may contain a single cavity or any desired number of cavities for the simultaneous molding of a plurality of articles as is well known in the art.

What is claimed is:

1. Molding apparatus comprising a parison mold having a mold cavity with an open end at one surface of said mold, a blow core insertable in said mold cavity through said open end on which said parison is to be molded, a neck mold disposed on said mold surface and having a neck opening in registration with said mold cavity and extending around the blow core to confine the neck portion of the parison, said neck mold having an annular flange engaging said blow core to close the neck mold cavity and to position the blow core in said neck mold, the neck mold having tapered flanges seated in the open end of said mold cavity for positioning the neck mold and the blow core within said cavity, and blow mold aligning means comprising depending lugs carried with said neck mold, said parison mold having transverse grooves to receive said lugs and adapted to permit said parison mold to be separated transversely to release the parison walls while the neck mold remains closed, whereby the parison may be removed on said blow core with the neck mold in place thereon.

2. Molding apparatus as set forth in claim 1 including a third mold part disposed to close the bottom end of the mold cavity and having a surface defining the closed end of the parison, and an injection passage in said last part registering with said cavity for the injection of flowable organic plastic material for forming said parison.

3. Molding apparatus as set forth in claim 1 wherein said parison mold has at least two mold cavities and said blow mold aligning means is disposed between said cavities.

4. Aparatus as set forth in claim 1 including a blow mold having a blow mold cavity to receive said blow core with the parison thereon, said blow mold having a transverse groove adapted to receive said neck mold and said tapered flanges and adapted to permit separation of said neck mold parts while said blow mold remains closed, and having positioning surfaces disposed to be engaged by said depending lugs for centering said neck mold and said blow core in said blow mold cavity.

5. Apparatus as set forth in claim 4 including a blow mold having a blow mold cavity to receive said blow core with the parison thereon, said blow mold having surfaces adapted to receive said first aligning means of said neck mold and to permit separation of said neck mold while said blow mold remains closed, and having positioning surfaces disposed to be engaged by said blow mold aligning means for centering said neck mold and said blow core in said blow mold cavity.

References Cited
UNITED STATES PATENTS

| | | | |
|---|---|---|---|
| 2,998,621 | 9/1961 | Adams et al. | 18—5 |
| 3,000,050 | 9/1961 | Schaich | 264—97 |
| 3,052,916 | 9/1962 | Campbell | 264—97 |
| 3,364,520 | 1/1968 | Hestehave | 18—5 |
| 3,364,521 | 1/1968 | Valyi | 18—5 |

J. SPENCER OVERHOLSER, Primary Examiner

M. O. SUTTON, Assistant Examiner